(12) United States Patent
Carlos

(10) Patent No.: US 7,663,535 B2
(45) Date of Patent: Feb. 16, 2010

(54) SYSTEM AND METHOD TO POSITION REGISTER AND PHASE SYNCHRONIZE A MONITORING NETWORK

(75) Inventor: John Don Carlos, San Diego, CA (US)

(73) Assignee: Information Systems Laboratories, Inc., San Diego, CA (US)

( * ) Notice: Subject to any disclaimer, the term of this patent is extended or adjusted under 35 U.S.C. 154(b) by 167 days.

(21) Appl. No.: 11/782,825

(22) Filed: Jul. 25, 2007

(65) Prior Publication Data

US 2009/0027272 A1    Jan. 29, 2009

(51) Int. Cl.
*G01S 13/06* (2006.01)
*G01S 13/36* (2006.01)
*G01S 13/00* (2006.01)

(52) U.S. Cl. .................. 342/125; 342/118; 342/127; 342/175; 342/195; 342/450; 342/451; 342/463

(58) Field of Classification Search ............. 342/27–51, 342/59, 82, 89–103, 118, 125, 127, 145, 342/165–175, 189–197, 450–465, 350, 385, 342/417, 442, 357.01–357.17
See application file for complete search history.

(56) References Cited

U.S. PATENT DOCUMENTS

| | | | | |
|---|---|---|---|---|
| 2,416,741 A | * | 3/1947 | Eltgroth | 342/125 |
| 2,531,412 A | * | 11/1950 | Deloraine | 342/44 |
| 2,736,892 A | * | 2/1956 | Moran, Jr. | 342/125 |
| 2,891,246 A | * | 6/1959 | Reed, Jr. | 342/46 |
| 3,213,449 A | * | 10/1965 | Kyoji et al. | 342/125 |
| 3,396,393 A | * | 8/1968 | Wagner | 342/125 |
| 3,680,121 A | | 7/1972 | Anderson et al. | |
| 3,706,096 A | * | 12/1972 | Hammack | 342/194 |
| 3,714,650 A | * | 1/1973 | Fuller et al. | 342/42 |
| 3,725,920 A | * | 4/1973 | Kupfer et al. | 342/125 |
| 3,870,993 A | * | 3/1975 | Biagi et al. | 342/47 |
| 3,953,856 A | * | 4/1976 | Hammack | 342/458 |
| 3,996,590 A | * | 12/1976 | Hammack | 342/465 |
| 4,021,807 A | | 5/1977 | Culpepper et al. | |
| 4,297,700 A | * | 10/1981 | Nard et al. | 342/125 |
| 4,728,959 A | | 3/1988 | Maloney et al. | |
| 4,804,961 A | * | 2/1989 | Hane | 342/125 |
| 5,298,904 A | * | 3/1994 | Olich | 342/42 |
| 5,365,516 A | * | 11/1994 | Jandrell | 342/457 |
| 5,534,876 A | | 7/1996 | Erickson et al. | |
| 5,706,010 A | * | 1/1998 | Franke | 342/47 |
| 5,790,076 A | | 8/1998 | Sypniewski | |

(Continued)

*Primary Examiner*—Bernarr E Gregory
(74) *Attorney, Agent, or Firm*—Nydegger & Associates

(57) ABSTRACT

A system is disclosed for position registration and phase synchronization of monitors in a monitor network. Each monitor includes a transceiver having a transponder circuit with a calibrated transponder delay. To measure a distance between monitors, an oscillator at a first monitor generates a measurement signal which is transponded by a second monitor for receipt by the first monitor. A phase difference between the received signal and the first monitor oscillator is determined and used with the signal velocity and transponder delay to calculate the distance between monitors. The measured distances are combined with other data (e.g. monitor elevations) to calculate monitor locations. A phase delay is then measured by transmitting a signal from the first to the second monitor for comparison with the second monitor oscillator. A phase difference between oscillators (for use in synchronizing the monitors) is then calculated using the phase delay, separation distance and signal velocity.

17 Claims, 1 Drawing Sheet

U.S. PATENT DOCUMENTS

| | | | |
|---|---|---|---|
| 5,977,913 A * | 11/1999 | Christ | 342/465 |
| 5,999,131 A | 12/1999 | Sullivan | |
| 6,166,691 A | 12/2000 | Lindqvist | |
| 6,784,827 B2 * | 8/2004 | Hirt | 342/42 |
| 6,963,301 B2 * | 11/2005 | Schantz et al. | 342/125 |
| 7,079,025 B2 * | 7/2006 | Michalson et al. | 342/450 |
| 7,298,314 B2 * | 11/2007 | Schantz et al. | 342/125 |
| 2002/0008625 A1 | 1/2002 | Adams et al. | |
| 2003/0174086 A1 * | 9/2003 | Hirt | 342/42 |
| 2004/0032363 A1 * | 2/2004 | Schantz et al. | 342/127 |
| 2005/0046608 A1 * | 3/2005 | Schantz et al. | 342/127 |

\* cited by examiner

SYSTEM AND METHOD TO POSITION REGISTER AND PHASE SYNCHRONIZE A MONITORING NETWORK

FIELD OF THE INVENTION

The present invention pertains generally to wireless monitoring networks. More particularly, the present invention pertains to systems for registering the positions of a network of monitors and phase synchronizing the network. The present invention is particularly, but not exclusively, useful for quickly establishing a monitoring network suitable for locating and tracking the position of a beacon inside a building.

BACKGROUND OF THE INVENTION

There are many circumstances in which there is a need to establish the accurate positioning and tracking of movable objects or individuals. This is particularly so when the individual or object is moving in a hostile or dangerous environment. One example is when a firefighter enters a structure during a rescue operation. In situations such as this, there is a need to determine the position of the firefighter from outside the structure with accuracies of approximately one meter. Although an object's position can be determined effectively outdoors using the current global positioning system (GPS), the GPS system is unsuitable, without augmentation, for locating moving objects indoors at accuracies of approximately one meter.

With this in mind, U.S. Pat. No. 6,965,344 entitled "Firefighter Locator" issued on Nov. 15, 2005, filed on Oct. 18, 2000 by Halsey et al. and assigned to the same assignee as the present invention discloses a system for locating and tracking a moveable beacon that is inside a structure. In overview, the system disclosed in Halsey '344 includes a base station and a plurality of monitors that are mutually dispersed outside the structure. The beacon is configured to transmit a low frequency (approximately 2 Mhz) RF signal that has good penetration through the walls of the structure. Each monitor receives the low frequency signal and measures the phase of the signal relative to an internal phase reference. The measured phase at each monitor is then compared with the measured phase at the other monitors to produce a plurality of relative phase delays, with each relative phase delay being indicative of a differential range estimate. These differential range estimates are then processed in a triangulation-type algorithm at the base station to determine the location of the beacon.

As disclosed in Halsey et al. '751, the location of each monitor must be accurately known to determine the location of the beacon. Moreover, to use the system efficiently in a rescue operation, the monitors must be quickly dispersed around the structure. In a typical application of the system disclosed in Halsey et al. '751, the monitors are preferably distributed somewhat uniformly around the structure to minimize geometric dilution of precision (GDOP) and increase system accuracy. As a consequence, only some of the monitors may be within line-of-sight of each other or the base station. Once dispersed, the monitor locations, including the elevation of each monitor, must be quickly acquired and communicated to the base station for use in the beacon location and tracking algorithm. In addition, the system should be able to periodically verify and quickly update the monitor locations in case one of the monitors is moved during the rescue operation.

In addition to registering the location of each monitor, the phase references at each monitor must either be synchronized or the relationship between phase references determined and input into the beacon location and tracking algorithm. For the later, the differences between phase references must be measured and communicated to the base station. In a typical rescue situation, the synchronization (or difference measurement) must be performed quickly, and may need to be performed under relatively adverse conditions. Once the monitor positions have been registered and the network synchronized, it may be necessary to resynchronize the phase references during the operation to assure system accuracy over long operational periods.

In light of the above, it is an object of the present invention to provide systems and methods suitable for the purposes of registering the positions of a network of monitors and phase synchronizing the network. It is another object of the present invention to provide systems and methods for quickly phase synchronizing and registering the positions of a network of monitors that can then be used to locate and track the position of a beacon inside a building. Yet another object of the present invention is to provide systems and methods for registering the positions of a network of monitors and phase synchronizing the network which are easy to use, relatively simple to implement, and comparatively cost effective.

SUMMARY OF THE INVENTION

The present invention is directed to a system and method for establishing position registration and phase synchronization for a network of monitors. Once the monitors have been synchronized and their positions registered, the network can be used to locate and track the position of a beacon inside a structure. In greater detail, the position of each monitor is registered at a base station by first measuring the distances between monitors. To measure these distances, each monitor includes a transmitter for transmitting measurement signals to other monitors, a transponder circuit for transponding signals from other monitors, and a receiver for receiving transponded signals. Importantly, the transponder circuit has a pre-identified transponder delay duration.

For the present invention, each monitor includes an oscillator for generating a measurement signal having a known frequency, which is typically in the ranges of approximately 1 to approximately 3 MHz. To determine the distance between a first and second monitor in the network, the first monitor generates and transmits a measurement signal to the second monitor having a known signal propagation velocity. The second monitor then transponds the measurement signal and the transponded signal is received by the first monitor. A phase comparison circuit at the first monitor then compares the phase of the received signal to the phase of the oscillator to determine a phase difference. The distance between the first and second monitors can then be calculated using the phase difference, the signal propagation velocity, and the transponder delay duration. This process can be repeated between different pairs of monitors in the network until a separation distance for each monitor pair has been measured.

Once the distances between monitors have been determined, the location of each monitor relative to a reference location can be determined. Typically, one of the monitors is collocated with the base station and this location is used as the reference location. In a first procedure, which can be accomplished when the network includes at least four monitors, each monitor is equipped with an elevation measurement instrument to measure the elevation of the respective monitor. For the present invention, such an instrument may include a global positioning system, a barometer that has been calibrated at a known elevation, or a link to a digital terrain elevation database. With the monitor elevations known, the measured distances between monitor pairs can be used to calculate the location of each monitor.

In an alternative procedure for determining the location of each monitor, the distances between monitors are measured using the method describe above. This alternative procedure can be used when the network includes at least three monitors and two of the monitors are positioned within line-of-sight of the base station. For this procedure, surveying equipment such as a theodolite or other optical means for measuring angles is used at the base station to determine the elevation and azimuth angles to the monitors that are within line-of-sight. The measured angles and distances can then be used to calculate the location of each monitor. Both of the procedures described above allow all of the monitor locations in the network to be registered in geo-coordinates (i.e. longitude, latitude and elevation) if the geo-coordinates of two of the network locations are provided.

As indicated above, each monitor includes a phase reference, such as an oscillator, that is provided to both register the positions of the monitors (see description above) and is used in locating and tracking the position of a beacon inside a structure. To perform the later function, the oscillators can either be synchronized or pair-wise phase differences between oscillator pairs can be measured and included in the algorithm used to locate and track the beacon. More specifically, the transmitters and receivers described above can be used to measure the pair-wise phase differences, which in turn can be used to either synchronize the oscillators or as an input into the beacon location algorithm.

To measure a pair-wise phase difference between an oscillator pair, such as the first monitor's oscillator and the second monitor's oscillator, the separation distance between first and second monitors is first measured as described above. Next, the first monitor's oscillator is used to generate a measurement signal which is then transmitted to the second monitor. The measurement signal is subsequently received at the second monitor where a phase comparison circuit compares the received signal to the second monitor's oscillator to establish a phase delay. Using the phase delay, the separation distance and the signal propagation velocity, the pair-wise phase difference between the first monitor's oscillator and the second monitor's oscillator can be calculated. Next, one of the oscillators can be corrected to synchronize the two oscillators. This process can be continued between different pairs of monitors until all the oscillators are synchronized. Alternatively, as indicated above, the pair-wise phase differences between oscillators can be recorded and used in the beacon locating algorithm.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
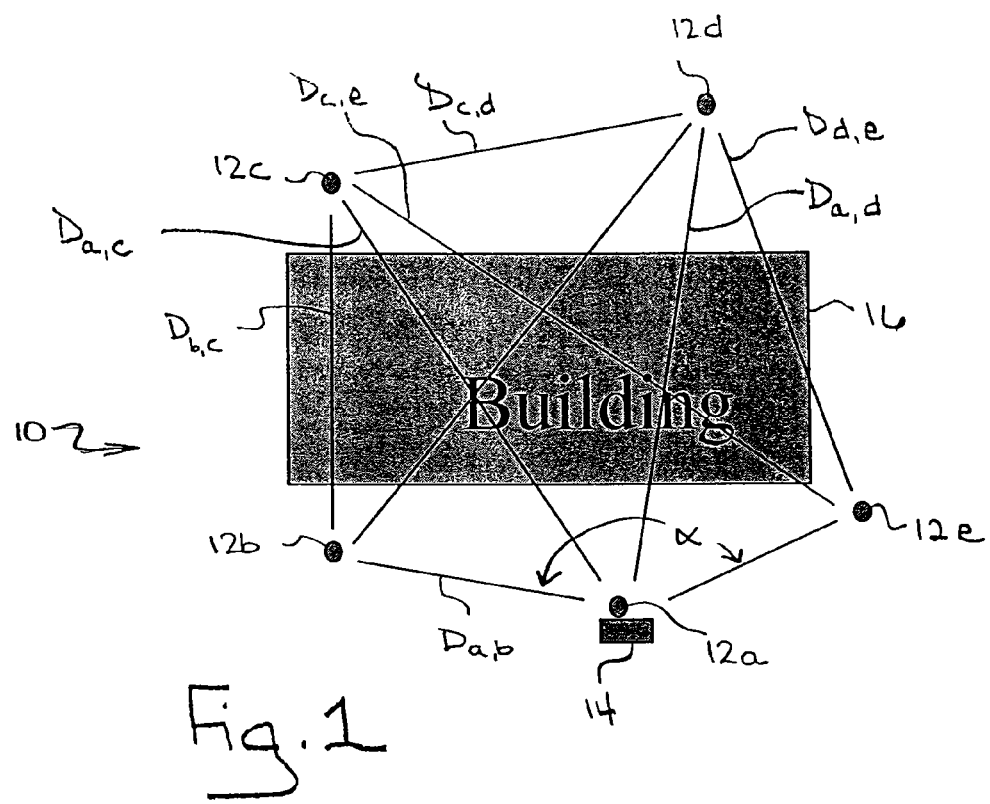
FIG. 1 is a plan view showing a network of monitors positioned outside and distributed around a building.

Referring initially to FIG. 1, a system 10 is shown having a network of monitors 12a-e and a base station 14. As further shown, the monitors 12a-e are positioned outside and distributed around a structure 16, which in this case is a building. Although FIG. 1 shows a network of five monitors 12, it is to be appreciated that this number of monitors is merely exemplary, and that more than five and as few as three monitors 12 can be used. The network, once properly prepared, can be used as part of a system for locating and tracking the position of a moveable signal emitting beacon (not shown) which can be positioned and moved inside or around the structure 16. The details of such a locating and tracking system are disclosed in U.S. Pat. No. 6,965,344, entitled "Firefighter Locator" and assigned to the same assignee as the present invention, which issued on Nov. 15, 2005 after being filed on Oct. 18, 2000 by Halsey et al., the entire contents of which are hereby incorporated by reference. The present application focuses on the preparation of the network, and more specifically, to a system and method for establishing position registration and phase synchronization for the network of monitors 12a-e.

Figure 2:
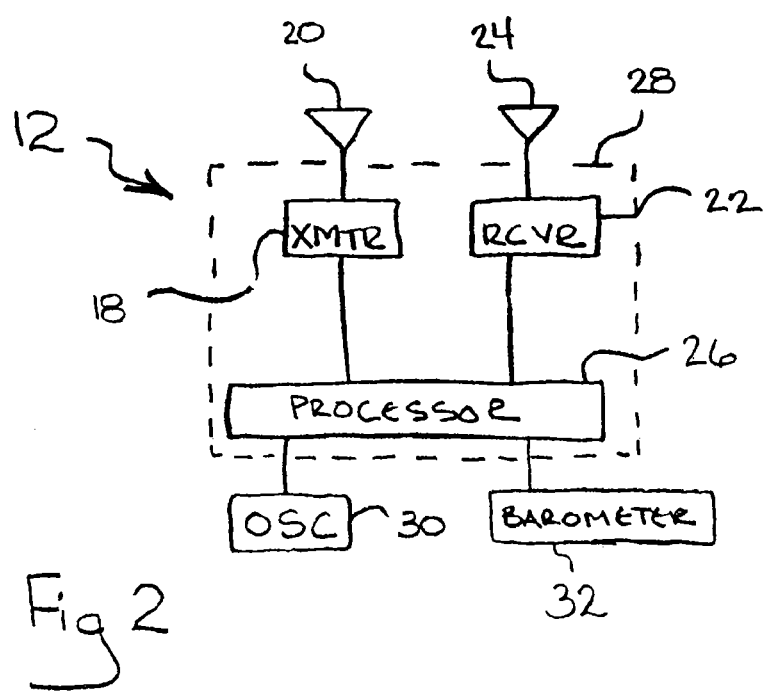
FIG. 2 is a simplified schematic of a monitor having components for position registering and phase synchronizing a network of similarly equipped monitors.

Continuing with FIG. 1, the position of each monitor 12a-e is registered at a base station 14 by first measuring the separation distances, $D_{a,b}$, $D_{a,c}$, $D_{a,d}$, $D_{a,e}$, $D_{b,c}$, $D_{b,d}$, $D_{b,e}$, $D_{c,d}$, $D_{c,e}$, and $D_{d,e}$ between respective pairs of monitors 12a-e. For the system 10, these separation distances are measured by the monitors 12a-e. As best seen in FIG. 2, each monitor 12 includes a transmitter 18 having an antenna 20 for transmitting measurement signals to other monitors 12, a receiver 22 having an antenna 24 for receiving signals from other monitors 12 and a processor 26. In some embodiments, the monitor 12 can be configured to allow the transmitter 18 and receiver 22 to share a common antenna. Together, these three components (i.e. the transmitter 18, receiver 22 and processor 26) cooperate to establish a transponder circuit 28 that can be calibrated to have a pre-identified (i.e. known) transponder delay duration. Once calibrated, the transponder circuit 28 can be used to transpond measurement signals received from other monitors 12.

Continuing with FIG. 2, it can be seen that each monitor 12 includes a phase reference, which in this case is an oscillator 30, for generating a measurement signal having a known frequency. For the system 10, the oscillators 30 of each monitor 12a-e operate at a common frequency which is typically in the range of approximately 1 MHz to approximately 3 MHz and corresponds to the frequency of the signal emitting beacon. However, in some embodiments, multiple frequencies are used to determine the separation distances, in which case each monitor 12a-e is equipped with more than one oscillator 30.

For a typical embodiment of a monitor 12, the processor 26 includes a logic circuit, memory for storing, among other things, data and control instructions, and a phase comparison circuit for determining a phase difference between a received signal and the local oscillator 30. Additionally, the processor 26 can include peripheral components such as a power supply. Although FIG. 2 shows a simplified schematic wherein the transmitter 18, receiver 22, processor 26 and oscillator 30 are shown as distinct components, it is to be appreciated that two or more of these components can be integrated together, for example on one integrated circuit or chip, and that two or more of these components may share one or more functional elements (e.g. circuits) of the integrated circuit or chip.

To determine the separation distance, $D_{a,b}$, between monitor 12a and monitor 12b in the network, one of the two monitors 12a,b, for example monitor 12a, generates and transmits a measurement signal which travels to the monitor 12b at a known signal propagation velocity. Monitor 12b then transponds the measurement signal and the transponded signal is received by monitor 12a. The phase comparison circuit at the monitor 12a then compares the phase of the received signal to the phase of the local oscillator 30 to determine a phase delay.

The separation distance, $D_{a,b}$, between monitor 12a and monitor 12b in the network is then calculated using the phase delay, the signal propagation velocity, and the transponder delay duration. This calculation can be performed at the monitor 12a or at the base station 14. For the former case, the calculated distance, $D_{a,b}$, can be modulated on a transmission signal at the monitor 12a and transmitted to the base station 14. This process can be repeated between different pairs of monitors 12 in the network until all of the separation distances $D_{a,b}, D_{a,c}, D_{a,d}, D_{a,e}, D_{b,c}, D_{b,d}, D_{b,e}, D_{c,d}, D_{c,e}$, and $D_{d,e}$ have been measured and compiled at the base station 14. In some implementations of the system 10, bistatic and multistatic measurements can be made. In addition, in some implementations of the system 10, the separation distances, D, are measured at multiple frequencies to resolve ambiguities that arise when phase delays are used to measure distance because a measured phase delay represents more than one possible distance. Specifically, the possible distances associated with a measured phase delay differ by an amount equal to the wavelength of the signal.

Once the separation distances have been compiled at the base station 14, the location of each monitor 12 relative to a reference location, which is typically the location of the base station 14, is determined. In a first procedure, which can be accomplished when the network includes at least four monitors 12, each monitor 12 is equipped with an elevation measurement instrument 32, such as a barometer, to measure the elevation of the respective monitor 12. These elevations are then transmitted to and compiled at the base station 14. The measured distances, D, and the monitor elevations are then used at the base station 14 to calculate the location of each monitor 12. In greater detail, in a typical application, the location of the base station 14 and at least one other location, which can be another monitor 12 or a point on the structure 16, is located in geo-coordinates (e.g. longitude, latitude and elevation), using for example a GPS receiver. Using these two geo-coordinates, the measured distances, D, and the monitor elevations, the location of each of the other monitors 12 in geo-coordinates can be calculated, for example, using a system of non-linear equations to solve for the location of each monitor 12a-e. Specifically, this involves finding the polyhedron with vertices at the monitors 12.

It is to be appreciated that the locations of all the monitors 12 can be calculated without some of the measured separation distances, D. In fact, the number of extraneous separation distances, D, will be a function of the number of monitors 12 used in the network. These extraneous separation distances can be used to refine the locations of the monitors 12, for example using a least squares algorithm. Additionally, the extraneous separation distances can be used to refine the signal propagation velocity for individual signal paths between specific pairs of monitors 12 to thereby improve overall system accuracy.

In an alternative procedure for determining the location of each monitor 12, the elevation measurement instruments 32 are not required. This alternative procedure can be used when the network includes at least three monitors 12 and two of the monitors 12, such as monitors 12b and 12e, are positioned within line-of-sight of the base station 14. For this procedure, the separation distances $D_{a,b}, D_{a,c}, D_{a,d}, D_{a,e}, D_{b,c}, D_{b,d}, D_{b,e}, D_{c,d}, D_{c,e}$, and $D_{d,e}$ are measured using the method described above. For this procedure, surveying equipment such as a theodolite (not shown) is used at the base station 14 to determine the elevation angles to the monitors 12b and 12e and the azimuth angle, α, as shown. For this purpose, a retro-reflector (not shown) can be positioned at the monitors 12b and 12e to reflect signals to the theodolite. The measured angles and the separation distances, D, can then be used to calculate the location of each monitor 12. In a typical application, the location of the base station 14 and at least one other location, which can be another monitor 12 or a point on the structure 16, is located in geo-coordinates (e.g. longitude, latitude and elevation) using, for example, a GPS receiver. Using these two geo-coordinates, the measured distances, D, and the angles measured with the theodolite, the location of each of the other monitors 12 in geo-coordinates can be calculated, for example, using a system of non-linear equations to solve for the location of each monitor 12a-e.

In addition to position registering the location of each monitor 12, the oscillators 30 in the network of monitors 12 must be synchronized to prepare the network to locate and track the position of a signal emitting beacon. Alternatively, pair-wise phase differences between pairs of oscillators 30 can be measured and included in the beacon location and tracking algorithm. To measure a pair-wise phase difference between a pair of oscillators 30, such as oscillator 30 of monitor 12a and the oscillator 30 of monitor 12b, the separation distance $D_{a,b}$, is first measured using the procedure described above. Next, the oscillator 30 of monitor 12a is used to generate a measurement signal which is then transmitted to the monitor 12b. The measurement signal is subsequently received at monitor 12b where a phase comparison circuit compares the received signal to the oscillator 30 of monitor 12b to establish a phase delay. Using the phase delay, the separation distance $D_{a,b}$, and the signal propagation velocity, the pair-wise phase difference between the oscillator 30 of monitor 12a and the oscillator 30 of monitor 12b can be calculated. Next, either the oscillator 30 of monitor 12a or the oscillator 30 of monitor 12b can be corrected to synchronize the oscillator 30 of monitor 12a with the oscillator 30 of monitor 12b. This process can be continued between different pairs of monitors 12 until all the oscillators 30 are synchronized. Alternatively, as indicated above, the pair-wise phase differences between oscillators 30 can be recorded and used in the beacon location and tracking algorithm.

While the particular System and Method to Position Register and Phase Synchronize A Monitoring Network as herein shown and disclosed in detail are fully capable of obtaining the objects and providing the advantages herein before stated, it is to be understood that they are merely illustrative of the presently preferred embodiments of the invention and that no limitations are intended to the details of construction or design herein shown other than as described in the appended claims.

What is claimed is:

1. A system for establishing position registration and pair-wise phase differences for a plurality of monitors in a monitor network, to prepare said monitor network for locating a beacon, said system comprising:

a means at a first said monitor for transmitting a measurement signal from said first monitor to a second said monitor with known phase and signal propagation velocity;

a means at said second monitor for transponding the measurement signal with a pre-identified transponder delay duration for transmission as a return signal from said second monitor to said first monitor;

a means for comparing the return signal with the transmitted signal to establish a phase difference;

a means for determining a separation distance between said first monitor and said second monitor using said established phase difference, said propagation velocity and said pre-identified transponder delay duration to register said first monitor relative to said second monitor; and a means at one of said first or second monitors for using said separation distance and a measurement signal from said other first or second monitors to determine a pair-wise phase difference for said first and second monitors.

2. A system as recited in claim 1 further comprising a means modifying one of said first and second monitors to eliminate said pair-wise phase difference between said first and second monitors and synchronize said first and second monitors.

3. A system as recited in claim 1 further comprising:
a means for determining separation distances between a third said monitor in said network and said first and second monitors;
a means for determining separation distances between a fourth said monitor in said network and said first, second and third monitors; and
a plurality of elevation measurement instruments, with each elevation measurement instrument being collocated with a respective said monitor in said network to determine an elevation for each said monitor, said monitor elevations for use with said separation distances to register the positions of said monitors in said network.

4. A system as recited in claim 1 further comprising a means collocated with said first monitor for determining an elevation angle to said second monitor, an elevation angle to a third monitor in said network and an azimuthal angle between said second and third monitors, said angles for use in position registering said monitors.

5. A system as recited in claim 1 wherein said measurement signal has a frequency in the range of approximately 1 MHz to approximately 3 MHz.

6. A system as recited in claim 1 wherein said transmitting means comprises an oscillator.

7. A system for registering the positions of oscillators in a network of common frequency oscillators and determining pair-wise phase differences between pairs of oscillators in said network to prepare said network for use in locating a beacon, said system comprising:
a means collocated with a first said oscillator in said network for transmitting measurement signals, said measurement signals being transmitted substantially in phase with said first oscillator, said transmitted signal having a signal propagation velocity;
a means collocated with said second oscillator for transponding a said measurement signal, said transponding means having a pre-identified transponder delay duration;
a means collocated with said first oscillator for receiving said transponded signal and comparing said received transponded signal with said first oscillator to establish a first phase delay;
a means for determining a separation distance between said first oscillator and said second oscillator using said established first phase delay, said propagation velocity and said pre-identified transponder delay duration, said separation distance for position registering said first oscillator relative to said second oscillator;
a means collocated with said second oscillator for receiving a said measurement signal and comparing said received signal with said second oscillator to establish a second phase delay; and a means for determining a pair-wise phase difference between said first and second oscillators using said second phase delay, said propagation velocity and said separation distance.

8. A system as recited in claim 7 further comprising a means for modifying one of said first and second oscillators to eliminate said pair-wise phase difference between said first and second oscillators and synchronize said first and second oscillators.

9. A system as recited in claim 7 further comprising a plurality of elevation measurement instruments, with each elevation measurement instrument being collocated with a respective said oscillator in said network to determine an elevation for each said oscillator, said oscillator elevation for use in registering the positions of said oscillators in said network.

10. A system as recited in claim 7 further comprising a means collocated with said first oscillator for determining an azimuthal angle and an elevation angle to said second oscillator and an azimuthal angle and an elevation angle to a third oscillator in said network, said angle for use in position registering said oscillators.

11. A system as recited in claim 7 wherein said measurement signal has a frequency in the range of approximately 1 MHz to approximately 3 MHz.

12. A method for registering the positions of oscillators in a network of common frequency oscillators and determining pair-wise phase differences between pairs of oscillators in said network to prepare said network for use in locating a beacon, said method comprising the steps of:
transmitting a first measurement signal from the position of a first said oscillator, said first measurement signal being transmitted substantially in phase with said first oscillator and having a signal propagation velocity;
transponding said first measurement signal at the position of a second said oscillator with a pre-identified transponder delay duration;
receiving said transponded signal at the position of said first oscillator and comparing said received transponded signal with said first oscillator to establish a first phase delay;
determining a separation distance between said first oscillator and said second oscillator using said established first phase delay, said propagation velocity of said first measurement signal and said pre-identified transponder delay duration, said separation distance for position registering said first oscillator relative to said second oscillator;
transmitting a second measurement signal from the position of a first said oscillator, said second measurement signal being transmitted substantially in phase with said first oscillator and having a signal propagation velocity;
receiving said second measurement signal at the position of said second oscillator;
comparing said received signal with said second oscillator to establish a second phase delay; and
determining a pair-wise phase difference between said first and second oscillators using said second phase delay, said propagation velocity of said second measurement signal and said separation distance.

13. A method as recited in claim 12 further comprising the step of modifying one of said first and second oscillators to eliminate said pair-wise phase difference between said first and second oscillators and synchronize said first and second oscillators.

14. A method as recited in claim 12 further comprising the steps of:

providing a plurality of elevation measurement instruments;

collocating a said elevation measurement instrument with each said oscillator in said network; and using each said elevation measurement instrument to determine an elevation for each said oscillator, said oscillator elevations for use in registering the positions of said oscillators in said network.

15. A method as recited in claim 12 further comprising the steps of:

measuring a first elevation angle from said first oscillator to said second oscillator;

measuring a first azimuth angle, said first azimuth angle measured from said first oscillator between a reference line and said second oscillator;

measuring a second elevation angle from said first oscillator to a third oscillator in said network;

measuring a second azimuth angle, said second azimuth angle measured from said first oscillator between said reference line and said third oscillator; and using said first and second elevation angles and said first and second azimuth angles with said separation distance to position register said oscillators.

16. A method as recited in claim 12 wherein said measuring steps are accomplished using a theodolite.

17. A method as recited in claim 12 wherein said first measurement signal has a frequency in the range of approximately 1 MHz to approximately 3 MHz and said second measurement signal has a frequency in the range of approximately 1 MHz to approximately 3 MHz.

* * * * *